United States Patent
Shiraishi et al.

(10) Patent No.: US 8,441,596 B2
(45) Date of Patent: May 14, 2013

(54) LIQUID CRYSTAL DISPLAY DEVICE HAVING BACKLIGHT WITH REFLECTIVE MEMBER

(75) Inventors: Yasuhisa Shiraishi, Mobara (JP); Ryosuke Miyachi, Mobara (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 204 days.

(21) Appl. No.: 12/984,626

(22) Filed: Jan. 5, 2011

(65) Prior Publication Data

US 2011/0164202 A1      Jul. 7, 2011

(30) Foreign Application Priority Data

Jan. 7, 2010   (JP) .................................. 2010-002135

(51) Int. Cl.
*G02F 1/1335* (2006.01)
(52) U.S. Cl.
USPC ........................................................... 349/62
(58) Field of Classification Search .................... 349/62, 349/63, 64, 65
See application file for complete search history.

(56) References Cited

U.S. PATENT DOCUMENTS

| | | | |
|---|---|---|---|
| 5,499,112 A * | 3/1996 | Kawai et al. ................ 358/475 |
| 8,139,198 B2 * | 3/2012 | Nishinaga et al. .............. 355/53 |
| 2004/0130515 A1 * | 7/2004 | Chuang et al. ................. 345/82 |
| 2008/0170174 A1 | 7/2008 | Nishiyama | |

FOREIGN PATENT DOCUMENTS

JP     2008-170739     7/2008

* cited by examiner

*Primary Examiner* — Akm Enayet Ullah
(74) *Attorney, Agent, or Firm* — Antonelli, Terry, Stout & Kraus, LLP.

(57) ABSTRACT

This invention provides a liquid crystal display device where the brightness of the backlight can be prevented from lowering when the liquid crystal display device and its frame are thin. The liquid crystal display device has a liquid crystal display panel and a backlight for radiating light on the rear of the liquid crystal display panel, and is characterized in that the backlight has light emitting diodes LED that are secured on one surface of a flexible printed circuit FPC and a light guide plate for guiding light emitted from the light emitting diodes, the flexible printed circuit has openings in a portion between the light emitting diodes and the light guide plate, which extends partly over the light emitting areas (EA) of the light emitting diodes, and a reflective member is provided on the other surface of the flexible printed circuit so as to cover the openings.

5 Claims, 7 Drawing Sheets

LIQUID CRYSTAL DISPLAY DEVICE HAVING BACKLIGHT WITH REFLECTIVE MEMBER

CROSS-REFERENCE TO RELATED APPLICATION

The present application claims priority over Japanese application JP2010-002135 filed on Jan. 7, 2010, the contents of which are hereby incorporated into this application by reference.

BACKGROUND OF THE INVENTION (1) Field of the Invention

The present invention relates to a liquid crystal display device, and in particular, to a liquid crystal display device having a backlight where light emitting diodes are provided on a flexible printed circuit.

(2) Description of the Related Art

Liquid crystal display devices are used as display devices for various electronics, such as cellular phones, digital still cameras and portable information terminals. They have a backlight for radiating light in the liquid crystal display panel in compact and thin display devices, as in JP2008-170739A, light-emitting diodes LED are used as the light source for the backlight, and as shown in FIG. 1, the light emitting diodes LED are fixed on a flexible printed circuit. The flexible printed circuit has wires, not shown, so that power can be supplied to the individual light emitting diodes LED in the structure.

FIG. 2 is a plan diagram showing the relative position of a flexible printed circuit FPC having light emitting diodes LED and a light guide plate LG for guiding light emitted from the light emitting areas EA of the light emitting diodes LED. FIG. 3 is a cross sectional diagram along A-A' in FIG. 2. A liquid crystal display panel, not shown, is provided at the bottom in FIG. 3. Thus, a reflective sheet RS is provided so as to cover the light emitting diodes LED and the light guide plate LG and reflect light coming from the bottom.

As shown in FIGS. 2 and 3 there is a space G between the light emitting diodes LED (light emitting areas EA) and the light guide plate LG. Ideally there would be no space G, but in reality there ends up being a space of 50 μm to 100 μm or more due to error in the manufacture of the parts and the assembly.

In addition, as shown in FIG. 3, the flexible printed circuit FPC, which is translucent orange, is exposed in the space G, and thus part of the light emitted from the light emitting areas EA of the light emitting diodes LED is absorbed or scattered by the flexible printed circuit FPC, as shown by the arrows, and fails to be guided into the light guide plate LG, and thus the brightness of the backlight lowers.

Furthermore, as liquid crystal display devices and their frames become thinner, light emitting diodes LED used for the backlight are becoming smaller, with a thickness t now of 0.6 mm or 0.4 mm, which is thinner than the light guide plate. Therefore, the reduction in brightness in the space G becomes more significant. The graph in FIG. 4 shows the change in the average brightness of the backlight as measured when there is a space G between the light emitting diodes LED and the light guide plate LG. The average brightness lowers by slightly less than 20% when the space G is 0.2 mm, even with light emitting diodes having a thickness t of 0.6 mm. The brightness is reduced by more than 30% for the same space G (0.2 mm) with light emitting diodes having a thickness t of 0.4 mm. Thus, it is clear that the problem with the brightness lowering due to the space G is very serious when liquid crystal display devices and their frames are thin.

In order to prevent the brightness of the display from lowering, reflective tape 10 can be pasted on the flexible printed circuit in front of the light emitting diodes LED, as shown in FIG. 5. However, there still remains a space between the light emitting diodes and the reflective tape 10, where light is absorbed by the flexible printed circuit. Furthermore, light is absorbed or scattered at the edges of the reflective tape, and thus less light enters into the light guide plate.

As shown in FIG. 6, it is also possible to prevent the flexible printed circuit FPC from absorbing light by making it white. In this case, however, the cost of the flexible printed circuit increases, and the effects of preventing the brightness from lowering are not significant, due to the low reflectance.

SUMMARY OF THE INVENTION

The present invention is provided in order to solve the above described problems, and an object of the invention is to provide a liquid crystal display where the brightness of the backlight can be prevented from lowering when the display and its frame are thin.

The display device according to the present invention is characterized as follows:

(1) A liquid crystal display device having a liquid crystal display panel and a backlight for radiating light on the rear of the liquid crystal display panel is characterized in that the backlight has light emitting diodes that are secured on one surface of a flexible printed circuit and a light guide plate for guiding light emitted from the light emitting diodes, the flexible printed circuit has an opening in a portion between the light emitting diodes and the light guide plate, which extends partly over the light emitting area of the light emitting diodes, and reflective member is provided on the other surface of the flexible printed circuit so as to cover the opening.

(2) The liquid crystal display device according to the above (1) may be characterized in that the reflective member is also a light blocking sheet for blocking light around the edges of the backlight.

(3) The liquid crystal display device according to the above (1) may also be characterized in that the opening is a rectangular slit and longer than the light emitting area of the light emitting diodes, or a trapezoid slit that is longer on the light guide plate side than on the light emitting diode side.

In the liquid crystal display device according to the present invention, the opening in the flexible printed circuit on which light emitting diodes are secured is between the light emitting diodes and the light guide plate, and extends partly over the light emitting area of the light emitting diodes, and a reflective member is provided on one surface of the flexible printed circuit so as to cover the opening, and therefore light can be prevented from being absorbed or scattered by the flexible printed circuit in the space between the light emitting diodes and the light guide plate, and light is reflected from the reflective member and be guided into the light guide plate. Thus, it is possible to effectively prevent the brightness of the backlight from lowering. In addition, the openings are easy to create through a process for punching or cutting out pieces of the flexible printed circuit, and therefore the cost of manufacture can be prevented from increasing.

In addition, the reflective member can also be used as a light blocking sheet for blocking light around the edges of the backlight, so that less parts are required and the cost of manufacture can be prevented from increasing.

Furthermore, the opening may be a slit that is longer than the light emitting area of the light emitting diodes or a trapezoid slit that is longer on the light guide plate side than on the light emitting diode side, and thus light that is emitted and diffused from the light emitting diodes can be efficiently introduced into the light guide plate, and it is possible to prevent the brightness of the backlight from lowering.

DESCRIPTION OF THE EMBODIMENTS

The liquid crystal display device according to the present invention is described in detail below.

Figure 7:
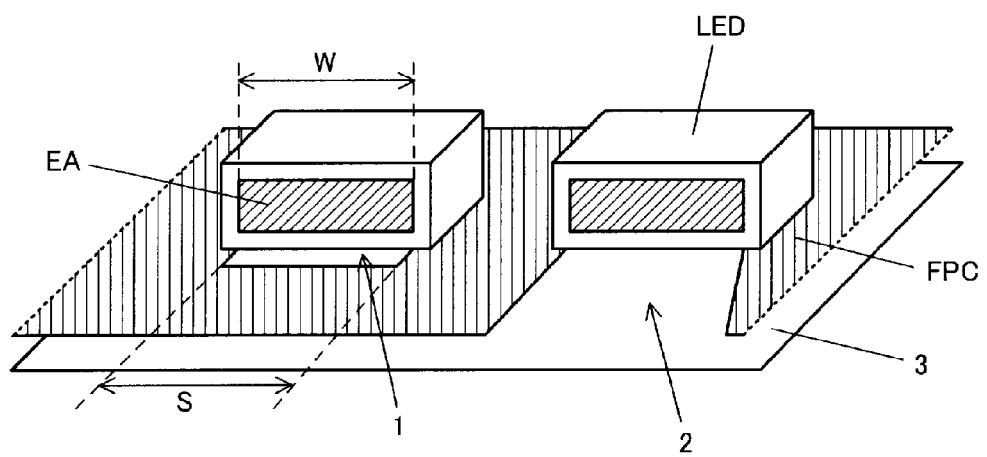
FIG. 7 is a perspective diagram showing the flexible printed circuit having light emitting diodes in the liquid crystal display device according to the present invention.

FIG. 7 is a perspective diagram showing the flexible printed circuit having light emitting diodes in the liquid crystal display device according to the present invention.

The liquid crystal display device according to the present invention has a liquid crystal display panel and a backlight for radiating light on the rear of the liquid crystal display panel, and is characterized in that the backlight has light emitting diodes LED that are secured on one surface of a flexible printed circuit FPC and a light guide plate for guiding light emitted from the light emitting diodes LED, the flexible printed circuit FPC has openings (1 and 2) in a portion between the light emitting diodes LED and the light guide plate, which extends partly over the light emitting areas (EA) of the light emitting diodes, and a reflective member 3 is provided on the other surface of the flexible printed circuit FPC so as to cover the openings (1 and 2).

Figure 1:
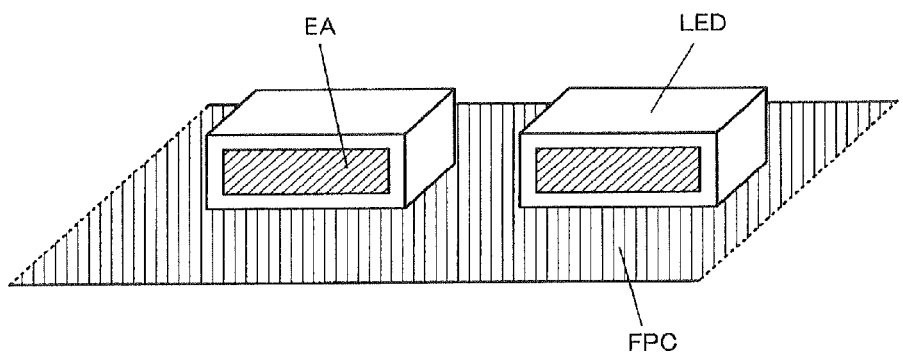
FIG. 1 is a perspective diagram showing a flexible printed circuit on which light emitting diodes are provided in a conventional liquid crystal display device.
Figure 2:
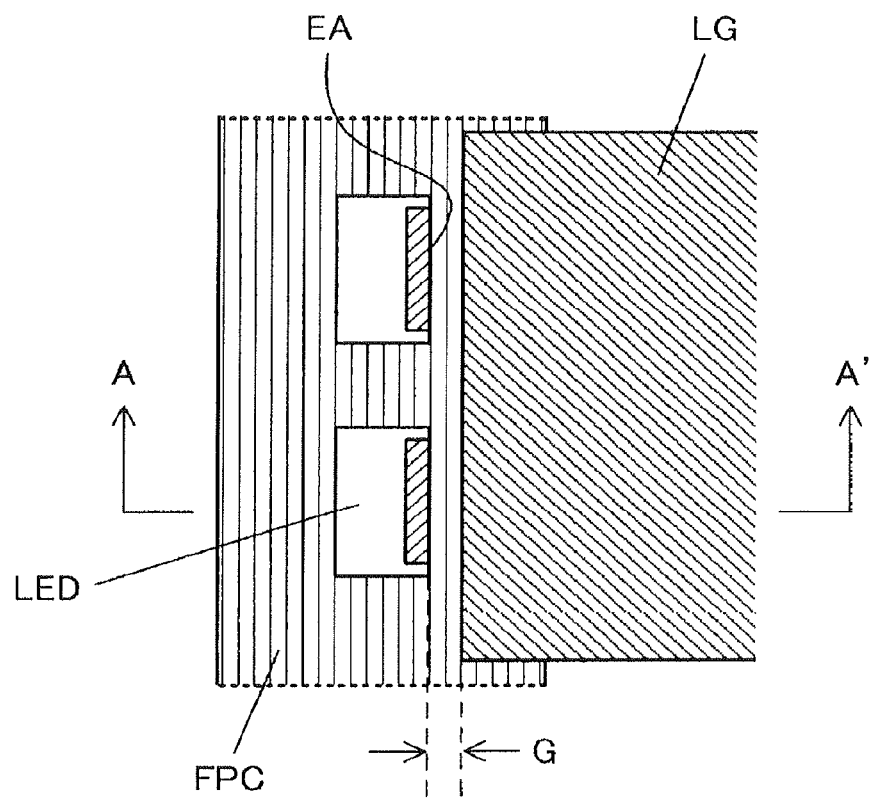
FIG. 2 is a plan diagram showing the relative position of the flexible printed circuit (light emitting diodes) in FIG. 1 and the light guide plate.
Figure 3:
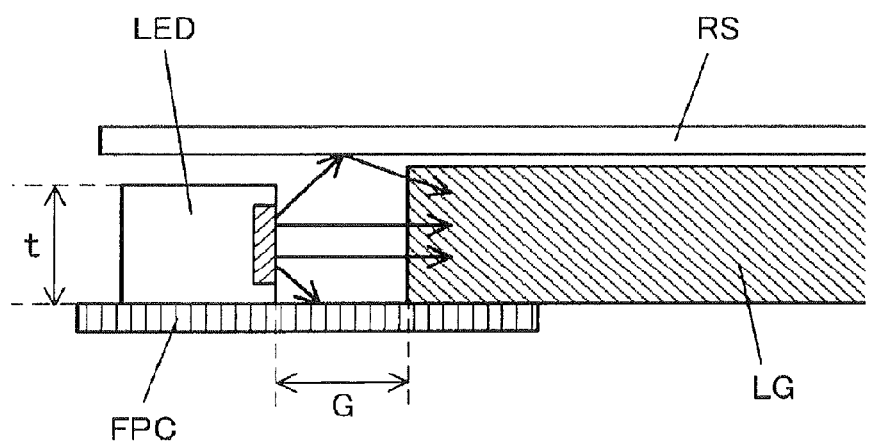
FIG. 3 is a cross sectional diagram along A-A' in FIG. 2.
Figure 8:
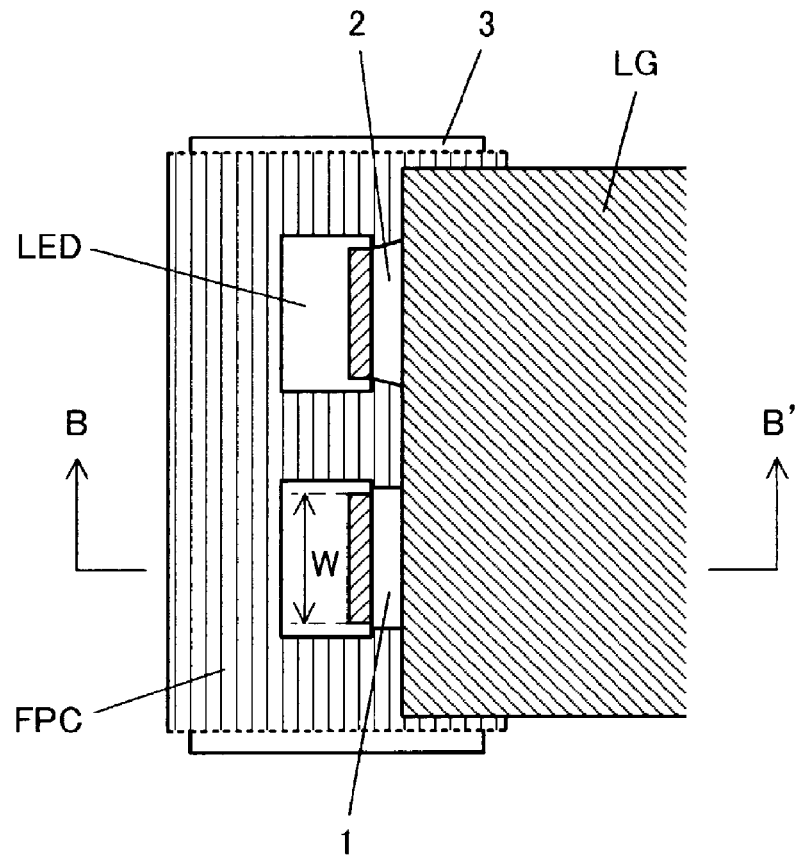
FIG. 8 is a plan diagram showing the relative position of the flexible printed circuit (light emitting diodes) in FIG. 7 and the light guide plate.
Figure 9:
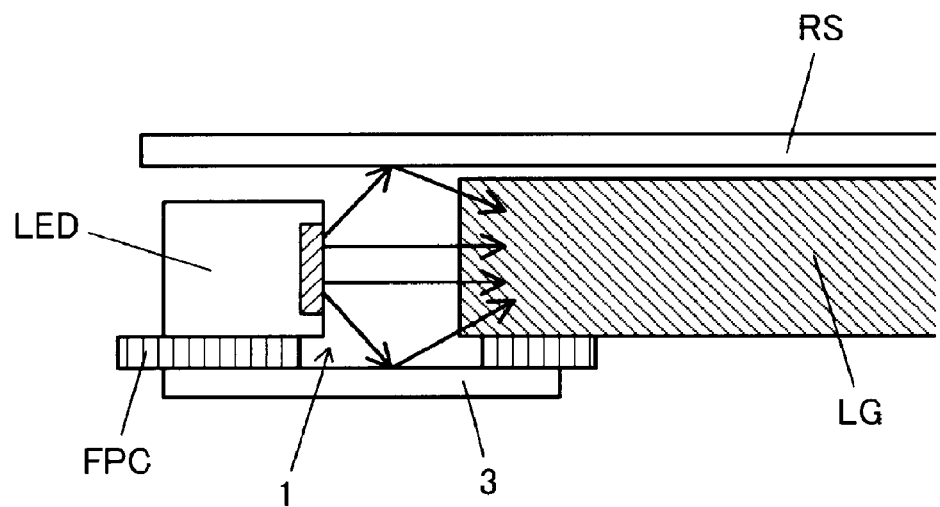
FIG. 9 is a cross sectional diagram along B-B' in FIG. 8.

FIG. 8 is a plan diagram showing the relative position of the flexible printed circuit FPC having light emitting diodes LED and the light guide plate LG for guiding light that is emitted from the light emitting area EA of the light emitting diodes LED. FIG. 9 is a cross sectional diagram along B-B' in FIG. 8. A liquid crystal display panel, not shown, is provided at the bottom in FIG. 9. Therefore, a reflective sheet RS is provided so as to cover the light emitting diodes LED and the light guide plate LG and reflect light coming from the bottom, as in FIG. 3.

As in JP2008-170739A, it is also possible to provide an optical sheet made up of a diffusing sheet and a prism sheet between the light guide plate LG and the liquid crystal display panel, not shown.

The openings in the flexible printed circuit of the liquid crystal display device according to the present invention are characterized by being rectangular slits 1 or trapezoid slits 2, as shown in FIG. 7. In the case of rectangular slits 1, the S of the slit is longer than the width W of the light emitting area EA of the light emitting diodes LED. In the case of trapezoid slits 2, the length is greater on the light guide plate LG side than on the light emitting diode LED side. As with the slits 1, it is naturally preferable for the length on the light emitting diode side to be greater than the width W of the light emitting area EA. By providing such openings (1 and 2), it becomes possible to efficiently reflect light that is emitted and diffused from the light emitting area EA and guide it to the light guide plate LG.

In addition, the openings (1 and 2) are easy to create through a process for punching or cutting out pieces from the flexible printed circuit, and therefore the cost of manufacture can be prevented from increasing. At the time of assembly, light emitting diodes LED are pasted or otherwise secured on a flexible printed circuit FPC having openings in such a manner that the openings extend partly over the light emitting area (EA) of the light emitting diodes LED.

Light that heads toward the openings (1 and 2) is reflected from the reflective member 3, as shown in FIG. 9. Though a certain efficacy can be expected as long as the reflectance of the reflective member is no less than the reflectance of the flexible printed circuit FPC, which is approximately 20%, a reflectance of 60% is desirable.

Figure 4:
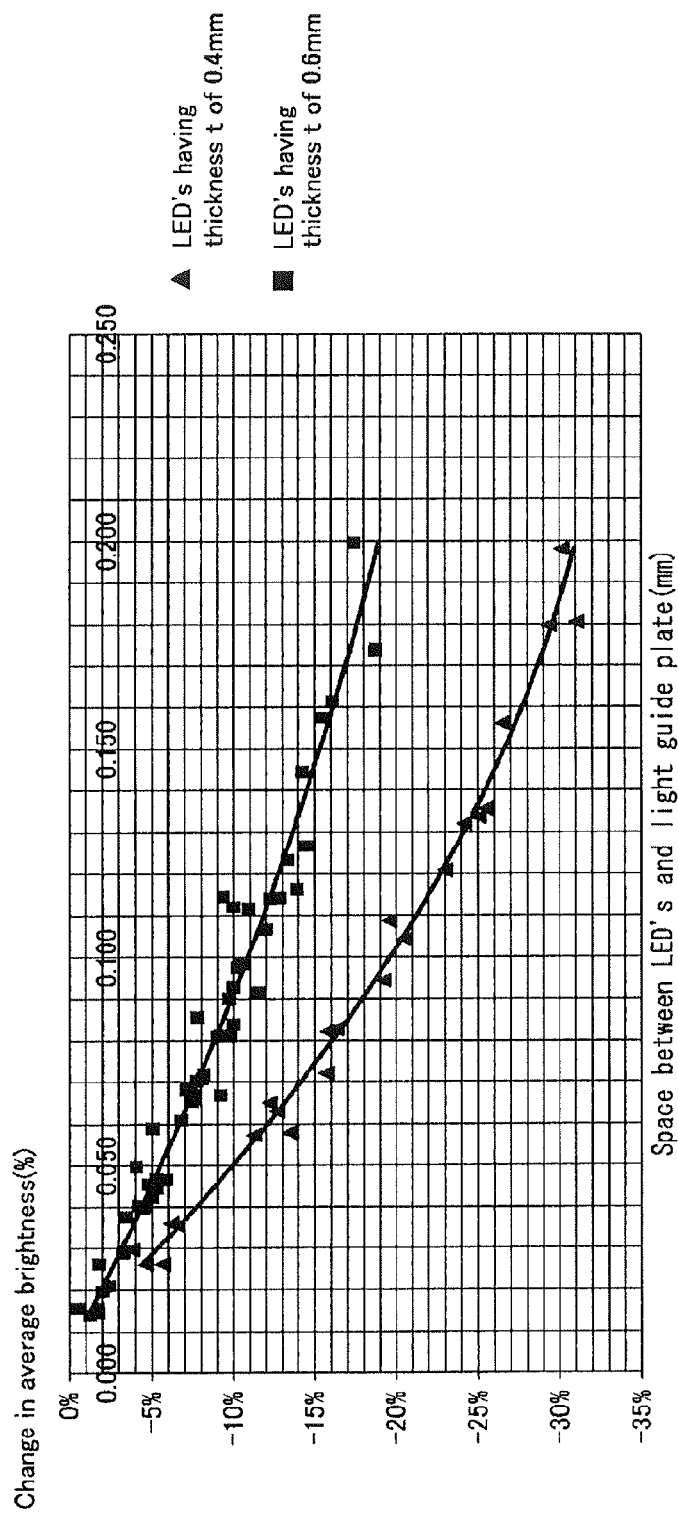
FIG. 4 is a graph showing the change in the average brightness for different spaces between the light emitting diodes and the light guide plate.
Figure 5:
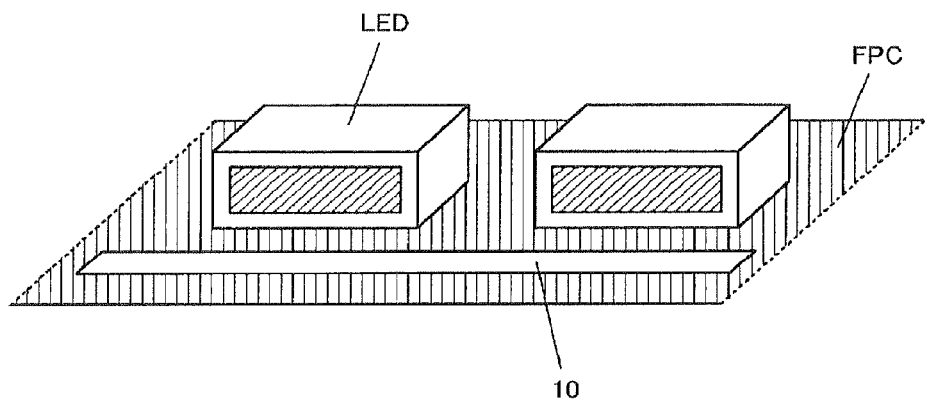
FIG. 5 is a perspective diagram showing an example of a conventional liquid crystal display device using the flexible printed circuit in FIG. 1.
Figure 6:
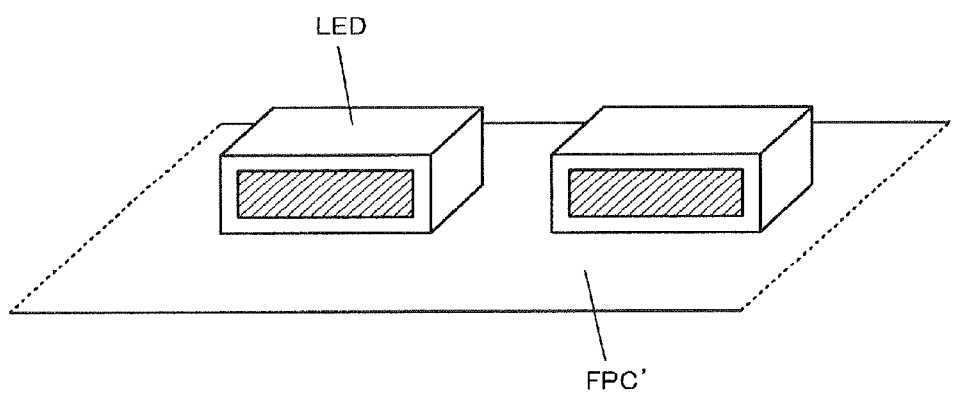
FIG. 6 is a perspective diagram showing another example of a conventional liquid crystal display device using the flexible printed circuit in FIG. 1.

As shown in FIG. 4, the reduction in brightness for a space G of 100 μm is approximately 20% when the thickness t of the light emitting diodes is 0.4 mm. In contrast, the reduction in brightness is approximately 10% when openings are created and a reflective member with a reflectance of 60% is provided, as according to the present invention.

Usually a light blocking sheet is provided around the edges of the backlight in order to prevent light from leaking around the display. It is also possible to provide a material having a high reflectance on top of the light blocking sheet (on the surface opposite to the surface facing the liquid crystal display panel) so that the light blocking sheet can also be used as the reflective member 3.

In addition, according to the present invention the brightness can be prevented from lowering even when there is a space between the light emitting diodes LED and the light guide plate LG, and therefore the light emitting diodes LED and the light guide plate LG can be positioned at a distance from each other, so that the inconsistency in brightness at the point where light enters the light guide plate can be reduced. As a result, it is also possible to make the frame narrower at the point where light enters.

As described above, the present invention makes it possible to provide a liquid crystal display device where the brightness of the backlight can be prevented from lowering when the liquid crystal display device and its frame are thin.

What is claimed is:

1. A liquid crystal display device having a liquid crystal display panel and a backlight for radiating light on the rear of the liquid crystal display panel, characterized in that
   the backlight comprises light emitting diodes that are secured on one surface of a flexible printed circuit and a light guide plate secured on the one surface of the flexible printed circuit for guiding light emitted from the light emitting diodes,
   the flexible printed circuit has an opening therethrough extending in a portion between the light emitting diodes and the light guide plate, the opening in the flexible printed circuit extending partly over the light emitting area of the light emitting diodes, and a reflective member is provided on the other surface of the flexible printed circuit so as to cover the opening in the flexible printed circuit.

2. The liquid crystal display device according to claim 1, characterized in that the reflective member is also a light blocking sheet for blocking light around the edges of the backlight.

3. The liquid crystal display device according to claim 1, characterized in that the opening is a rectangular slit and longer than the light emitting area of the light emitting diodes, or a trapezoid slit that is longer on the light guide plate side than on the light emitting diode side.

4. The liquid crystal display device according to claim 1, wherein the opening in the flexible printed circuit includes a first side portion extending substantially in parallel to a light emitting face of a respective one of the light emitting diodes and a second side portion of the opening which faces the first side portion of the opening and extending substantially in parallel to an edge face of the light guide plate facing the light emitting face.

5. The liquid crystal display device according to claim 4, wherein the reflective member extends so as to at least cover the first and second side portions of the opening in the flexible printed circuit.

\* \* \* \* \*